March 21, 1933. E. G. BUSSE 1,902,215
BRAKE BEAM SUPPORT BRACKET
Filed Nov. 3, 1930
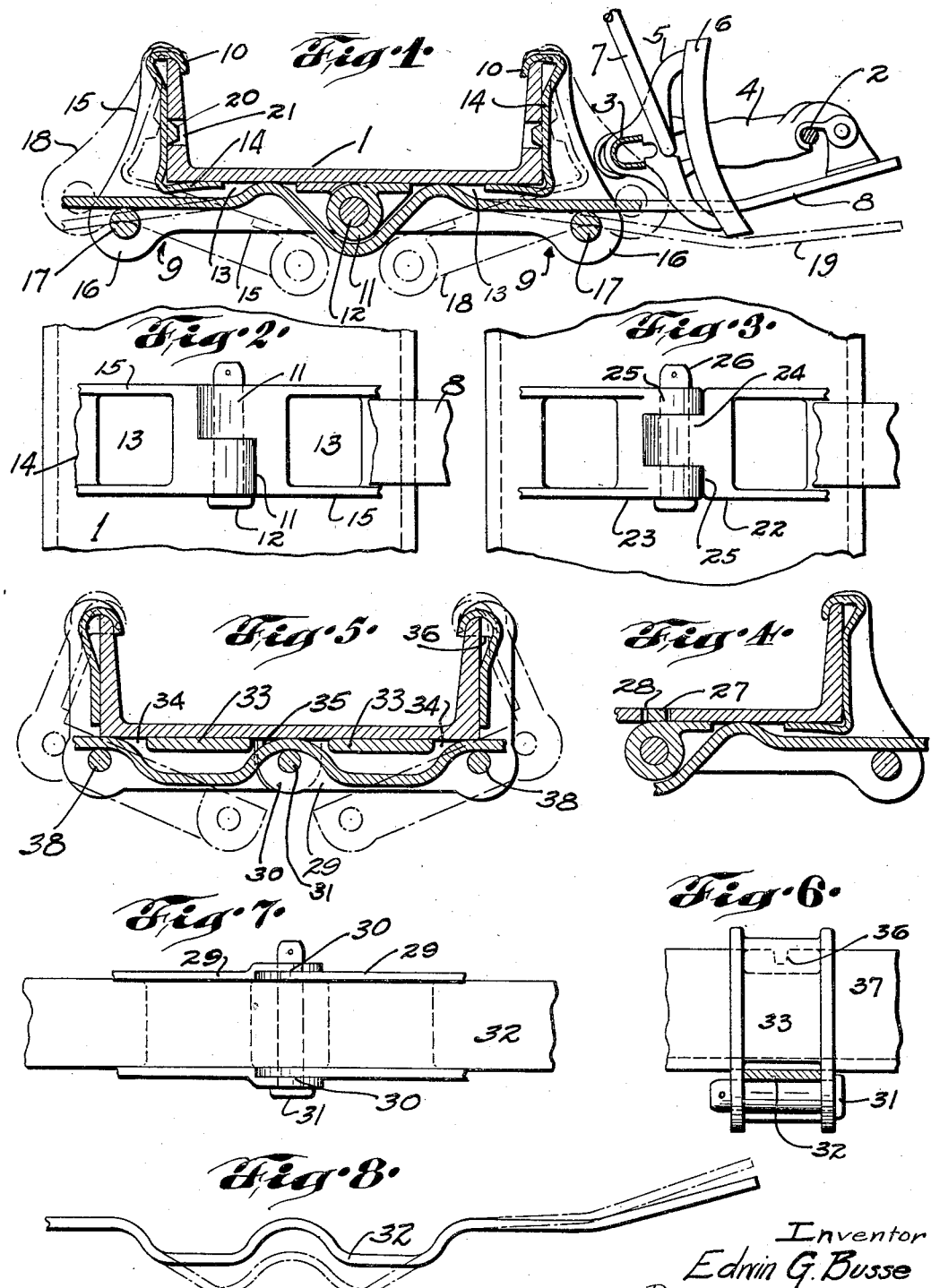

Patented Mar. 21, 1933

1,902,215

UNITED STATES PATENT OFFICE

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS

BRAKE BEAM SUPPORT BRACKET

Application filed November 3, 1930. Serial No. 493,191.

My invention relates to railway rolling stock and consists in a novel arrangement for supporting a brake beam guard, guide, or support member on a truck spring plank or other element.

Manufacturers and users of railway cars are familiar with the type of safety device comprising a rigid or flexible bar or strap extending transversely of the spring plank and projecting beneath the brake beam and serving to support the latter if the brake hangers should fail. Frequently these devices not only serve as emergency supports, but are utilized as supports throughout the use of the beam and particularly to support and guide it during application of the brakes.

Many different methods of mounting supports on the truck spring plank have been suggested and a considerable number have been actually used. One example of a support mounting structure which has gone into extensive use is illustrated in Patent No. 1,182,455, issued to E. G. Busse. In this and similar applications, the bracket is riveted to the spring plank, which method of attachment is satisfactory on new equipment and occasionally on old equipment which is being equipped with the safety device in shops having adequate facilities for such work.

However, it is frequently desirable to apply the safety device to trucks already built and it is then necessary to either dismantle the truck in order to take out the spring plank and attach the brackets in the usual way, or to run the trucks out from under the cars, turn the trucks up-side down, make holes in the plank with hand equipment, and then rivet the brackets thereon with hand equipment. Either of these methods is costly both on account of time and of labor.

The main object of my present invention is to provide a means for mounting the safety device which can be readily applied to spring planks in trucks although no provision was made for the application of the safety device at the time the truck was manufactured. Other detailed objects of my invention will appear from the following description and inspection of the accompanying drawing in which—

Figure 1 is a vertical transverse section through a truck spring plank, a safety bar, and its supporting bracket and also indicating an adjacent brake beam and shoe.

Figure 2 is a bottom view of the bracket structure, being broken away in part.

Figure 3 is a similar bottom view illustrating a modification.

Figure 4 is a transverse vertical section through one half of a spring plank and support bracket illustrating another modification.

Figure 5 is a transverse section through a spring plank illustrating another modification.

Figure 6 is an end elevation of the structure shown in Figure 5.

Figure 7 is a bottom view of the same.

Figure 8 is a side view of the safety bar formed of spring material and showing how it is distorted when applied to its supporting bracket.

In the structure indicated in Figures 1 and 2, I indicate a channel spring plank 1 and a brake beam comprising tension member 2, a compression member 3, and a strut 4 and mounting a brake head 5 provided with a shoe 6, the same being suspended from the truck frame by the usual hanger 7. All of the above mentioned parts are of familiar construction and in themselves form no part of my present invention.

The brake beam guard, guide, or support member 8 is shown as consisting of a flat bar and preferably, but not necessarily, formed of spring or yielding material.

This member 8 is mounted on the spring plank by means of a two-part bracket comprising duplicate parts 9, each being of a general L shape and having a hook 10 at the upper end of its upright leg for engaging the top edge of the spring plank flange, and having an apertured boss 11 at the other end of its horizontal flange for receiving a holding pin 12. Bosses 11 overlap, as best shown in Figure 2, so that a common pin can secure both of them together and in position on the spring plank. Preferably, each part 9 is of channel cross section having a substantial opening 13 in its web 14 and having its flanges 15 extended adjacent to the corner, as indicated at 16, and apertured to receive supporting pins 17 which carry the member 8.

The dot and dash lines 18 in Figure 1 indicate the manner in which the parts 9 may be separately hooked over the opposite sides of the spring plank, after which they may be swung into position as indicated by the solid lines where they are held by insertion of pin 12. The dot and dash lines 19 in Figure 1 indicate the normal form of the support member 8, which is somewhat distorted when applied to its supporting bracket, being held in the distorted position by the pins 17. This distortion results in the support member 8 thrusting upwardly on the spring plank and downwardly, through pin 17, on the bracket parts 9, thereby holding all of the elements against rattling.

If desired, the bracket parts 9 may include lugs 20 adapted to be received in suitable openings 21 in the spring plank flanges to positively prevent any movement of the bracket lengthwise of the spring plank.

In Figure 3, I illustrate a modified form of bracket structure in which the horizontal legs 22 and 23 are male and female, respectively, the toe 24 fitting in between the jaws 25, whereby the holding pin 26 is placed in double shear.

In the modification shown in Figure 4, I omit the lugs extending through the spring plank flanges and provide in lieu thereof, a lug 27 on the upper face of one or both of the horizontal legs, the lug being received in the opening 28 formed in the web of the spring plank.

In the structure shown in Figure 5, the webs 33 of the bracket parts do not have inter-engaging bosses at their ends, but have their flanges 29 overlapped, as indicated at 30, to receive the holding pin 31. This pin also contributes to retaining the support member 32 in position and, with this structure, it will be necessary to disassemble the bracket parts from each other whenever the supoprt bar 32 is applied or removed. The support member is originally shaped as indicated by the dot and dash lines in Figure 8 and, when applied to the bracket, is held in distorted position by pin 31 so as to prevent rattling of the parts. Additional retaining pins 38 may be inserted through the bracket flanges, although the support 32 will be held in place without these pins.

In this form, the brackets are also channel shaped in cross section, but the webs 33 are provided with openings 34 and 35. I also show another means of preventing longitudinal movement of the bracket along the spring plank comprising a rib or lug 36 on the bracket and a corresponding notch in the edge of the spring plank flange 37.

In each of the above structures, I provide a simple bracket readily applied to spring planks by an ordinary workman and requiring no special work on the spring plank. After application, the support member may be readily removed and replaced or, if desired, the bracket and support member may both be removed.

I have illustrated the device as forming a third point support extending beneath the middle portion of the brake beam. My device may be used also as a fourth point support located near the end of the beam.

While my device is particularly adapted for use in connection with the application of safety guard, guide, and support members to old trucks, it will be understood that it is not limited to such application and may also be used in new equipment. Modifications other than those shown may be made in the details of construction without departing from the spirit of my invention and I contemplate the exclusive use of all such variations as come within the scope of my claims.

I claim—

1. A two-part mounting bracket for a brake beam guard, guide, or support member, each part having a portion adapted to engage a truck spring plank and another portion in rigid relation therewith and adapted to be secured to the other part to retain the bracket in place.

2. A mounting bracket for a brake beam guard, guide, or support member comprising two rigid L-shaped parts, one leg of each part being adapted to be applied to a spring plank flange, and means for securing the other legs of said parts to each other to hold the bracket in assembled position.

3. A mounting bracket for a brake beam guard, guide, or support member comprising two rigid L-shaped parts, the vertical leg of each part forming a hook at its upper end for engaging a truck spring plank, and means for assembling the other legs with each other.

4. A mounting bracket for a brake beam guard, guide, or support member comprising two rigid L-shaped parts, one leg of each part being adapted to engage a spring plank, and the other legs of the parts having overlapping end elements adapted to receive a common retaining pin.

5. A mounting bracket for a brake beam guard, guide, or support member comprising duplicate rigid parts adapted to be hooked over opposite sides of a truck spring plank and to be interconnected to retain the bracket in place.

6. A mounting bracket for a brake beam guard, guide, or support member comprising two separately formed parts of channel cross section, said parts being adapted to be applied to a truck spring plank with their webs adjacent to the spring plank and with their flanges projecting outwardly to receive a brake beam guard, guide, or support member between them, means connecting the inner ends of said parts to hold them in assembled position on the spring plank, and removable elements between said flanges and spaced from said means for supporting said member.

7. A mounting bracket for a brake beam guard, guide, or support member comprising two separately formed parts of channel cross section having portions adapted to be hooked over the sides of a truck spring plank and having other portions adapted to be interconnected to hold the bracket in place, the webs of said parts being apertured to permit a brake beam guard, guide, or support member to project therethrough to contact with the spring plank and a removable element between the flanges of said parts for supporting said member.

8. A mounting bracket for a brake beam guard, guide, or support member having separately formed L-shaped parts of channel cross section, and removable pins extending between the flanges of said parts for supporting said member.

9. In a car truck, a transverse beam like member, a bracket comprising separately formed parts, each part including a portion suspended from the side of said member and a portion rigid with said first mentioned portion and extending beneath said member, means securing said latter mentioned portions together to retain the bracket in assembled position, and a brake beam guard, guide, or support member carried by said bracket.

10. In a car truck, a spring plank, a bracket comprising two rigid parts of channel cross section applied to said plank, means securing said parts together to retain them in place on said plank, a brake beam guard, guide, or support member extending between the flanges of said bracket, and removable pins spaced from said means and extending transversely of said flanges and engaging said member.

11. In a car truck, a spring plank, a two-part bracket of channel cross section having apertures in its web beneath said plank, means for securing said parts together to thereby hold said bracket on said spring plank, and a brake beam guard, guide, or support member of yielding material carried by said bracket beneath said web and having portions projecting through said apertures and engaging said plank to prevent said parts from rattling.

12. In a car truck, a spring plank, a two-part bracket, each part having a leg engaging an upwardly facing element of said plank and having a leg extending below and along the bottom of said plank, a retaining pin securing said latter mentioned legs together to retain said bracket in position, a brake beam guard, guide, or support member applied to said bracket, and removable elements detachably securing said member to said bracket, said member passing beneath said retaining pin, whereby said member may be removed without disassembling said bracket.

13. In combination, a mounting bracket for application to a car truck element and comprising two rigid parts, each part having a portion adapted to engage a side of said truck element and another portion adapted to be secured to the other part to retain the bracket in place on said element, and a brake beam guard, guide, or support member carried in said bracket, there being an opening formed in at least one of the latter mentioned portions of said bracket, and said member having a projection extending into said opening whereby said member is held against substantial longitudinal movement relative to said bracket.

14. In a railway truck, a spring plank, a resilient brake beam guard, guide, or support member, and a bracket mounting said member on said spring plank and comprising a pair of channel section rigid parts, each having a portion hooked over a flange of said spring plank, and another portion extending beneath same, there being an aperture in said latter portion, a retaining pin securing together said latter portions to hold said bracket on said spring plank, and elements extending between the flanges of said bracket and supporting said member, said member being distorted in insertion into said bracket and being shaped to bear alternately against said supported elements and said spring plank through said apertures whereby the parts are held securely in place and rattling is prevented.

15. In a railway truck, a frame element, a support element projecting therefrom, a resilient brake beam guard, guide, or support member, and a bracket mounting said member on said support element, said bracket comprising a pair of rigid L shaped parts, each hooked over the top of said support element and having a portion extending beneath the same and detachably secured to the corresponding portion of the other part, and pins detachably securing said member to said bracket whereby said member may be removed without disengaging said bracket from said support element.

16. In combination, a car truck transverse beam-like member, a bracket comprising separately formed rigid parts, each part including a portion depending from said member and a portion extending beneath said member towards the other part, means securing said latter-mentioned portions together to retain the bracket parts in assembled position on said member, and a brake beam guard, guide or support of resilient material carried by said bracket and yieldingly contacting with said member to prevent rattling.

In testimony whereof I hereunto affix my signature this 29th day of October, 1930.

EDWIN G. BUSSE.